United States Patent [19]
Ando

[11] Patent Number: 5,162,868
[45] Date of Patent: Nov. 10, 1992

[54] SPECTROPHOTOMETER

[75] Inventor: Osamu Ando, Kyoto, Japan

[73] Assignee: Shimadzu Corporation, Kyoto, Japan

[21] Appl. No.: 589,555

[22] Filed: Sep. 28, 1990

[30] Foreign Application Priority Data

Sep. 30, 1989 [JP] Japan .................. 1-256878

[51] Int. Cl.⁵ .............................................. G01J 3/28
[52] U.S. Cl. .................................................. 356/326
[58] Field of Search .................... 356/319-334

[56] References Cited

U.S. PATENT DOCUMENTS

| | | | |
|---|---|---|---|
| 3,946,351 | 3/1976 | Bronikowski et al. | 337/224 |
| 4,092,511 | 5/1978 | Austin | 219/10.79 |
| 4,664,522 | 5/1989 | LeFebre | 356/334 |
| 4,709,989 | 12/1987 | Mächler | 356/334 |

Primary Examiner—F. L. Evans
Assistant Examiner—K. P. Hantis
Attorney, Agent, or Firm—Armstrong & Kubovcik

[57] ABSTRACT

A spectrophotometer includes a frame made of Glass Fiber Reinforced Unsaturated Polyester, a light source portion, a monochromator portion and a detector. The frame is fabricated with features such as bosses, holes, grooves, steps and detents, so that the frame makes it easy to install necessary parts at the precise position.

5 Claims, 6 Drawing Sheets

Fig.6
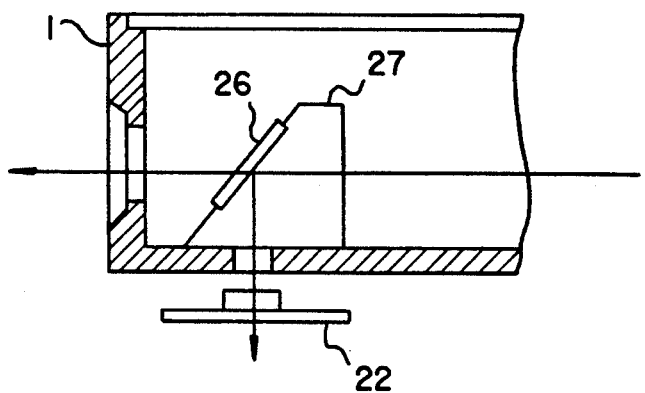
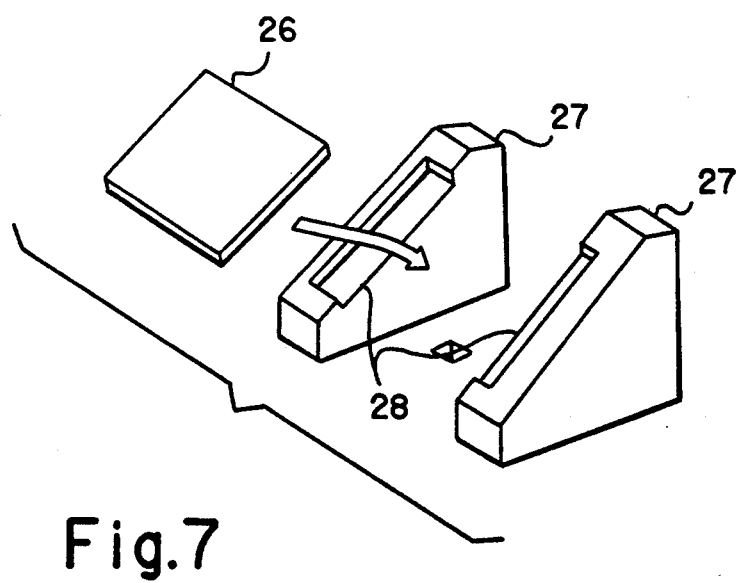
Fig.7

SPECTROPHOTOMETER

BACKGROUND OF THE INVENTION

1. Field of the Invention

This invention relates to a spectrometer, which is used with an electromagnetic wave intensity detector and with a liquid cell, a flow cell or a holder of a specimen, and which measures a specimen's absorbance or reflection of electromagnetic wave at a particular wavelength and/or a particular range of wavelength. Such spectrometer includes instruments, which are usually classified as a UV spectrophotometer, a visible light spectrophotometer, an IR spectrometer, an atomic absorption spectrometer, a mass spectrometer and an electron spin resonance spectrometer.

The most widely used spectrometer is a UV-visible light spectrophotometer, which is called spectrophotometer in this specification.

2. Description of Related Art

A spectrophotometer has, as the essential parts, a light source portion and a spectroscope portion which separates light into its spectral component. In the light source portion, generally, lamps and a light source changing mechanism are set on a frame. In the spectroscope portion, monochromator such as grating or prism and wave length changing mechanism, is set on a frame.

Usually, such a frame is made of metal, and is fabricated into its particular shape by either a sheet metal processing, a metal cutting processing or a casting. Because metal is not easy to work, a frame can not be fabricated with the accuracy that a spectrophotometer demands for its frame. Thus, fabricating a spectrophotometer with such frame, requires many parts and requires further adjustment after the parts are installed on the frame.

As a result, it takes a long time for fabricating the frame and adjusting the spectrophotometer during assembly. Thus, the quality control of a spectrophotometer is difficult and costly.

Some frame improvements have been made in order to overcome above mentioned difficulty. FIG. 8 shows an example of a conventional spectrophotometer. A frame 51, which is made of metal provides the complete spectrophotometer's base. A lamp and mirror 53 and monochromator mechanism 54 are installed on the frame 51. A cover 52 is provided for covering the complete spectrometer. This type of spectrophotometer will maintain an accuracy of the position between the parts, so that it is easy to control the quality of a final product. However, because the frame 51 is large and heavy, it is time consuming to install all of the parts on it. Further, making adjustments, checking up and repairing, the light source portion and the spectroscope portion separately, is difficult. Thus, productivity as a whole decreases in the production of such a spectrophotometer.

FIG. 9 shows an other example of a conventional spectrophotometer. A lamp and mirror 53 are installed on a frame 55, which is made of metal. The spectroscope parts and mechanism are installed on a separate frame 56, which is also made of metal. The frame for the light source portion 55 and the frame for spectroscope portions 56 are installed on a single main frame 51, which is also made of metal. A cover 52 is provided for covering the complete spectrophotometer. The necessary parts are easy to install on both frames of this type of spectrophotometer. Further making adjustments, checking up, and repairing can be done separately, for each portion. However, when each portion is installed on the main frame 51, it is necessary to secure each portion at a precise position, and to connect electrical wires to each other. Moreover, it is difficult to maintain the precise positioning with accuracy during a long period of time.

SUMMARY OF THE INVENTION

It is a primary object of this invention to provide a frame material for a spectrophotometer which can be fabricated with a high degree of accuracy and which maintains its shape during long periods of use and at high temperatures.

It is another object of this invention to provide a frame for a spectrophotometer, or a portion thereof, which is fabricated with a positioning means for positioning parts thereon. The positioning means includes features such as bosses, holes, grooves, steps and detents, so that the frame makes it easy to install each necessary part at the precisely connect position.

It is another object of this invention to provide a frame for a spectrophotometer, or a portion thereof, in which the positioning means includes an aligning means for aligning each part in a specific orientation in its position, such as bosses, holes, and grooves.

It is another object of this invention to provide a frame for a spectrophotometer, which has box structure, so that the frame is protected from distortion or twist.

The above objects are accomplished in accordance with the principle of the invention, in which a frame of a spectrophotometer is made of a Glass Fiber Reinforced Unsaturated Polyester(GFRP). The GFRP is a plastic made of unsaturated polyester which is a matrix resin and glass fiber which is a modifier. The GFRP may be used as a bulk molding compound and is fabricated to particular shape by a molding process. GFRP can be easily formed to a particular shape with a tolerance of ±0.01 mm (millimeter). The frame made of GFRP maintains its shape within the above tolerance for long periods of time. Also, it has heat resistant properties such that the frame maintains its shape when subjected to temperatures of about 100° C., which usually occur at the light source portion of a spectrophotometer. Moreover, the frame made of GFRP can be fabricated with a positioning means for positioning parts, which are installed thereon, and aligning means for aligning each part in its alignment over it has been positioned with a tolerance of ±0.01 mm, which usually satisfies a spectrophotometer's demand for accuracy. As a result, a production process for assembling and checking up the product is easily and efficiently accomplished, thus increasing the productivity of producing the spectrophotometer.

BRIEF DESCRIPTION OF THE DRAWING

Further details are explained below with the help of the examples illustrated in the attached drawings in which:

FIG. 6 is a cross-sectional view of a light monitor mechanism, which is part of the spectroscope portion;

FIG. 7 is a perspective view of a supporting part for a half-silvered mirror which is used in the light monitor mechanism of FIG. 6;

DETAILED DESCRIPTION OF THE PREFERRED EMBODIMENT

Figure 1:
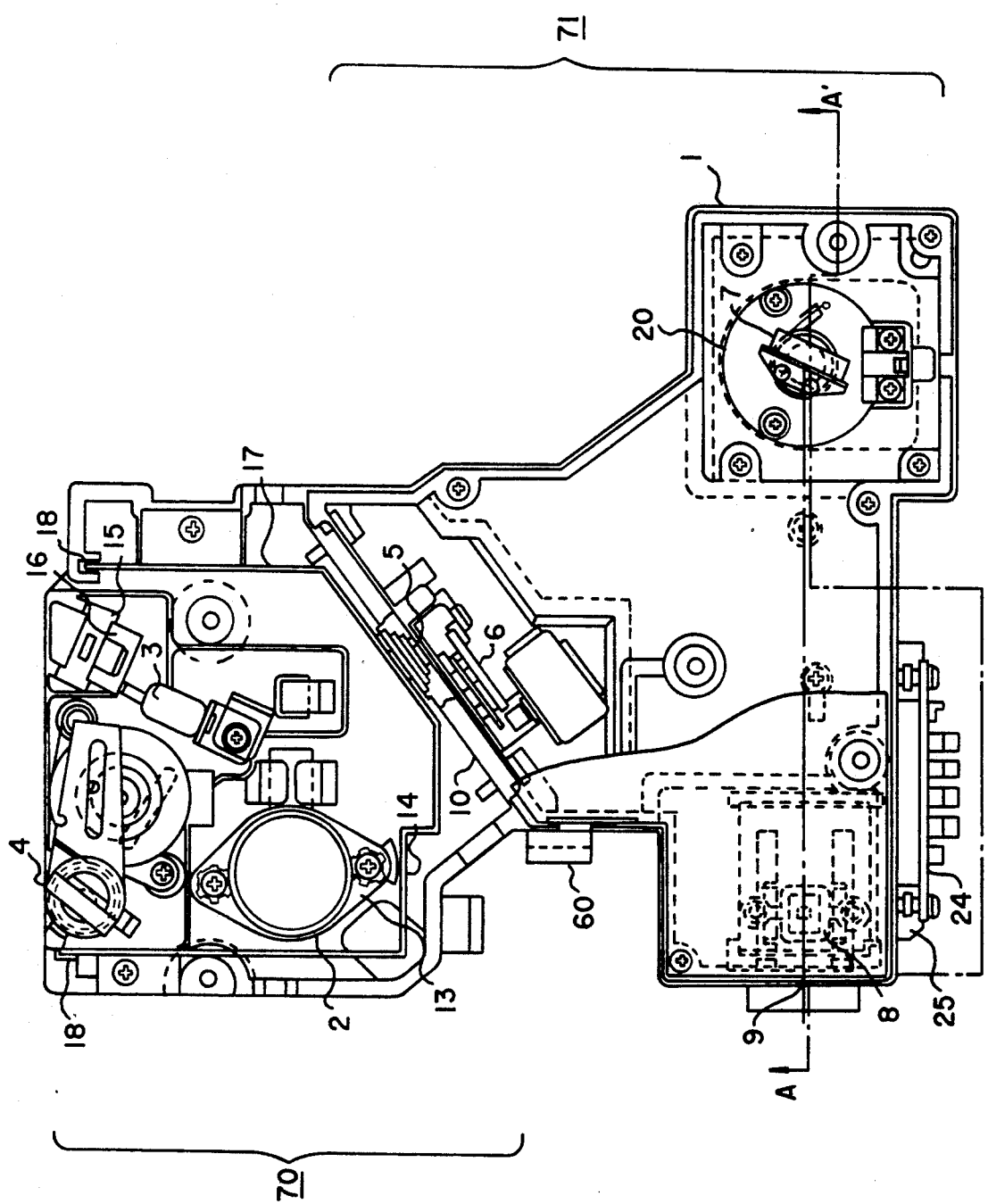
FIG. 1 is a plan view of the spectrophotometer according to the present invention.

The GFRP can be fabricated to particular shape with a tolerance of ±0.01 mm by a molding process. A heat distortion of the GFRP may occur at around 200° C. The GFRP does not become rusty. The GFRP is also a light material compared with metal. The GFRP is obtained from Asahi Glass Inc., Tokyo Japan under a trade name of "Rosite", which is a registered trade mark in Japan by Rostone Inc., Lafayette, Indiana, U.S.A. Properties of the GFRP vary with the amount and kind of modifier. One of such modifier is a glass fiber. If the glass fiber content exceeds 20%, the molding process will be difficult. If the glass fiber content is too small, the property of the GFRP becomes the property of the unsaturated polyester, so that the desired properties of the frame such as hardness and heat resistance can not be obtained. The preferred glass fiber content of the GFRP is from 5 to 20%, and most preferably, it is 15%. The GFRP which contains 15% glass fiber can be obtained from the Asahi Glass Inc. under the name of "Rosite 3550C". This material is preferred for the frame of the instant invention. The following table includes some properties of the GFRP, which is provided by Asahi Glass Inc.

TABLE

| property | ASTM Test | Unit | 3550A | 3550C |
|---|---|---|---|---|
| Glass fiber content | | % | 5 | 15 |
| Specific gravity | D792 | | 2.08 | 1.94 |
| Water absorption 24 Hrs | D570 | % | 0.1 | 0.1 |
| Flexural strength | D790 | kg/mm$^2$ | 7 | 13 |
| Flexural fatigue strength | D790 | kg/mm$^2$ | 1050 | 1100 |
| Compressive strength | D695 | kg/mm$^2$ | 13 | 15 |
| Tensile Strength | D638 | kg/mm$^2$ | 3.4 | 4 |
| Notched Izod impact strength | D256 | FtLb/IN | 2 | 4 |
| Dielectric strength | D149 | KV/mm | 12 | 12 |
| Dielectric constant 60HZ | D150 | | 5.2 | 5.2 |
| Dielectric constant 10$^6$HZ | D150 | | 4.9 | 4.9 |
| Dissipation factor 10$^3$HZ | D150 | | 0.018 | 0.018 |
| Dissipation factor 10$^6$HZ | D150 | | 0.011 | 0.011 |
| Volume Resistivity | D257 | 10$^{14}$ Ωcm | 2 | 2 |
| Arc Resistance | D495 | sec | 190–240 | 180–225 |
| Heat distortion 264PSI | D648 | °C. | 200 | 200 |
| Maximum continuous service temperature | D794 | °C. | 150 | 150 |
| Flammability (UL-94) (Independent) | D635 | | incombustible V-O | incombustible V-O |
| Flammability (UL-94) (Level) | D229 | | incombustible | incombustible |
| Induced time (HOT WIRE) | D229 | sec | 231 | 126 |
| Burning time (HOT WIRE) | D229 | sec | 39 | 52 |
| Thermal conductivity | C177 | 10$^{-4}$ cal/sec/°C./cm | 22 | 22 |
| Coefficient of linear expansion | D696 | 10$^{-5}$ cm/cm/°C. | 2 | 2 |
| Oxygen Index of rusting | D2863 | % | 62 | 53 |

The GFRP is used as a bulk molding compound and is fabricated into the frame. A transfer fabrication process is used for the fabrication. The transfer fabrication process includes, first pre-heating the bulk molding compound to a melting point, then the compound is filled into a pot which is a chamber communicating with the mold. Then the two molding pieces are tightened together, the molding compound is displaced into the molding pieces from the pot by the piston action, then the molding compound becomes hardened, after setting for a period of time, and finally the frame is pulled out from the molding pieces.

Referring to FIG. 1, a frame 1 made of GFRP provides a base for both a light source portion generally shown at 70, and a spectroscope portion generally shown at 71. The frame 1 has a lidless box shape, so that it is easy to install all necessary parts from the opening above, it is easy to seal the box, and the walls of the box help to strengthen the rigidity of the frame. The frame has 190 mm width, 223 mm length, and 76 mm height. The average thickness of the base of the frame 1 is 4 mm, the wall thickness is 4 mm, and the total weight is 564 g (gram).

In the light source portion 70, there are a deuterium lamp 2 for providing ultraviolet light and a halogen lamp 3 for providing visible light. A rotary mirror 4 is provided to change the light source from the deuterium lamp 2 to the halogen lamp 3 and vice-versa.

Figure 10:
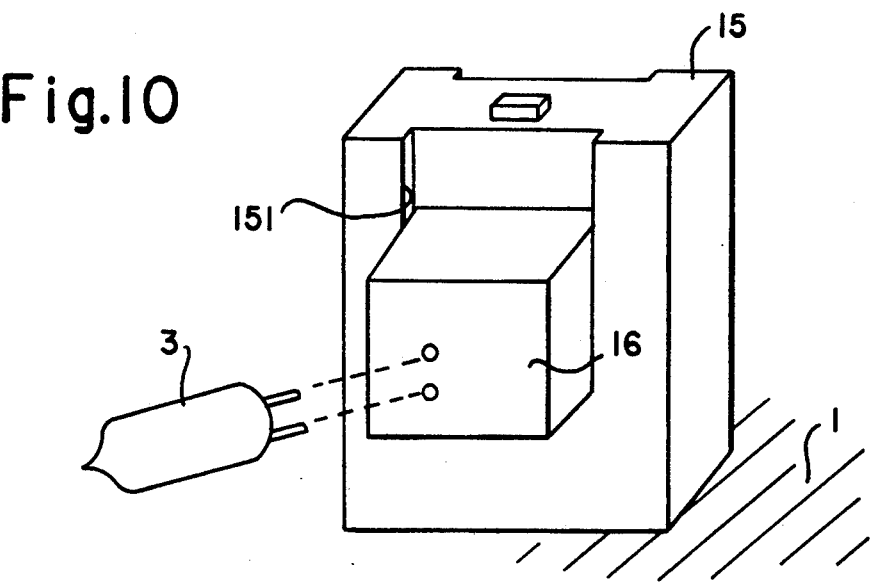
FIG. 10 is a perspective view of a halogen lamp and its socket, which are a part of the light source portion.

A boss 14 which projects upward from the frame 1, is provided in order to position a socket 13 for the deuterium lamp 2. When the socket 13 is installed on the frame 1, a part of periphery of the socket 13 fits in to the boss 14, so that the socket 13 for deuterium lamp 2 is aligned in a desired orientation. As can be seen clearly in FIG. 10, a socket 16 for the halogen lamp 3 is located in position on small wall 15 which projects from the frame 1. Recess 151 on wall 15 is provided to securing position the socket 16 on wall 15.

Figure 4:
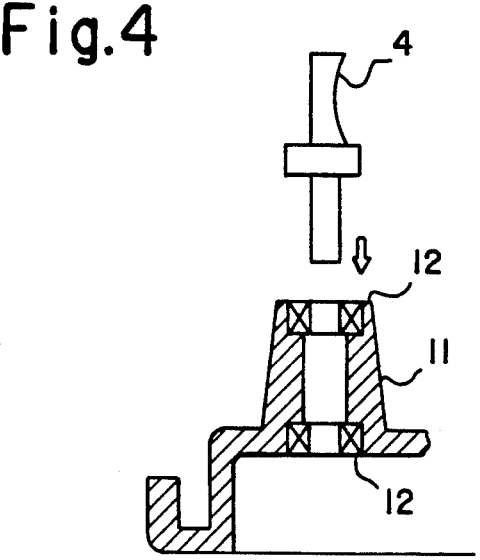
FIG. 4 is a cross-sectional view of a supporting part for a rotary mirror, which is part of the light source portion.

Referring to FIG. 4, an axial support shaft of the rotary mirror 4 is inserted in a center hole of upper and lower bearings 12. The bearings 12 are secured in their position by means of boss 11 on the frame 1.

Electrical connections, such as wires for the lamps, are guided by a hook 60 fabricated on the frame 1. The hook 60 has a groove on its underside for accepting the wires therein.

On the wall of the frame 1, around the light source portion 70, there is a reflection panel 17 which substantially contains the heat generated by the lamps. The reflection panel 17 is secured in its position by means of grooves 18 formed on the wall of the frame 1.

Figure 3:
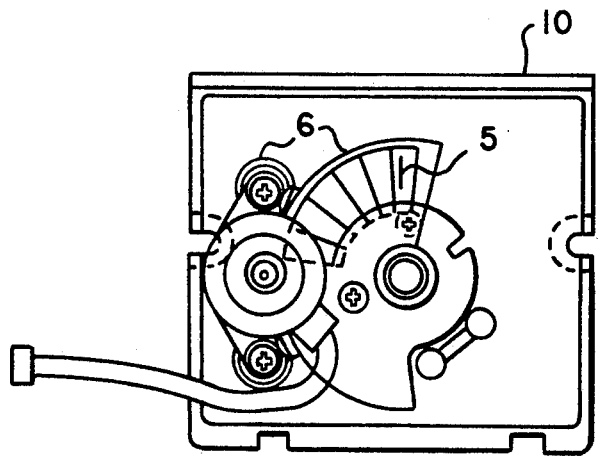
FIG. 3 shows a partition plate with a filter mechanism positioned between the light source portion and the spectroscope portion.

The light source portion 70 and the spectroscope portion 71 are divided by a partition plate 10, which is fabricated separately from the frame 1. Referring to FIG. 3, filters for entrance light and a filter changing mechanism 6 are installed on the partition plate 10. These filters are provided in order to prevent light of an unnecessary wavelength from entering the spectroscope portion 71. For example, if a desired wavelength is 350 nm, a band pass filter which passes a light whose wavelength is between 280 nm and 380 nm is chosen by the filter changing mechanism 6.

Because the GFRP has a proper fluidity when it is fabricated by the molding process, it is easy to fabricate two or more parts by molding process at the same time. Moreover, it is easy to fabricate parts that are different in size, such as the frame 1 and the partition plate 10. In this preferred embodiment, the frame 1 and the partition plate 10, whose width is 80 mm, length is 70.5 mm and whose thickness is 5.5 mm, are fabricated from the same mold, at the same time.

In the spectroscope portion 71, monochromator 7 which includes a grating and a rotary mechanism for rotating the grating. The monochromator 7 is made up as a separate unit and is secured in position in a hole 20 on the frame 1. Between the monochromator 7 and a slit for exit light 9, there is a light intensity monitor, which measures the intensity of a portion of the exit light. Referring to FIG. 6 and FIG. 7, the light intensity monitor includes a half-silvered mirror 26 and a detector 22. The half-silvered mirror 26 is positioned in a light path at an angle of 45 degrees to the light path. A portion of the exit light is reflected by the half-silvered mirror 26 and the reflected light travels to the detector 22. In order to properly position the half-silvered mirror 26, two walls 27 are fabricated on the frame 1. The peripheries of the two walls 27 have angles of 45 degrees, on which steps 28 are fabricated. The half-silvered mirror 26 is positioned in steps 28 and is secured with an adhesive agent, which is an ethoxyline resin known as "Araldite" (the Ciba-Geigy brand of a reaction product of epichlorohydrin and isopropylidine bisphenol).

Figure 2:
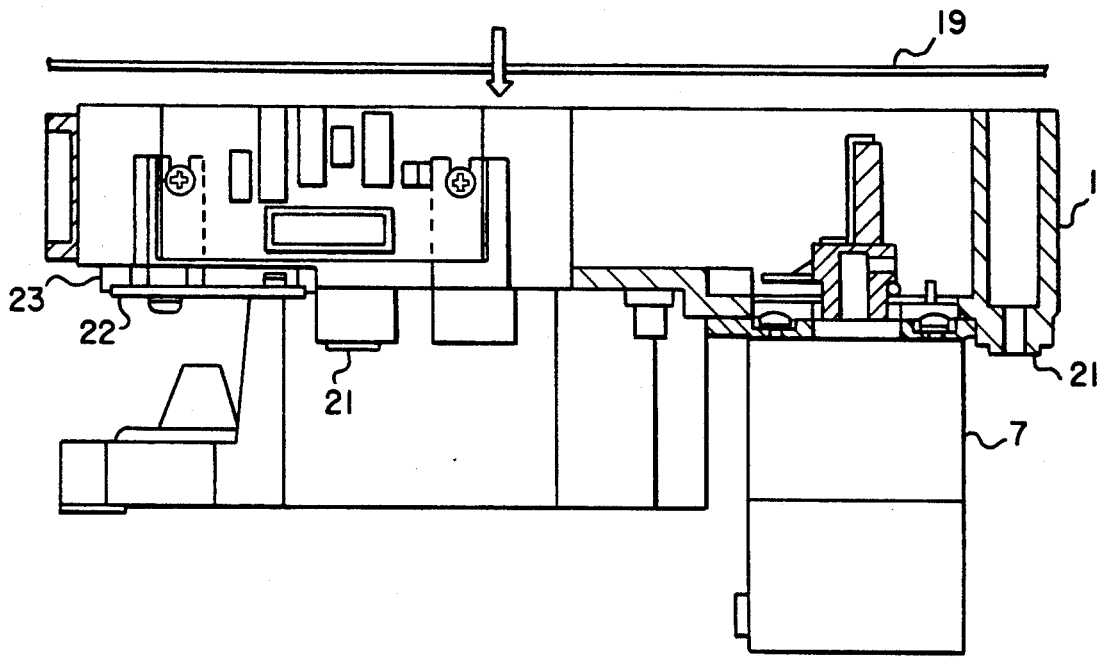
FIG. 2 is a cross-sectional view along line A—A' of the spectrophotometer according to FIG. 1.

A lid 19, in FIG. 2, covers and seals the spectroscope portion 71 wherein the lid 19 has a groove for engaging an upper portion of the wall of the frame 1 and the partition plate 10.

Figure 5:
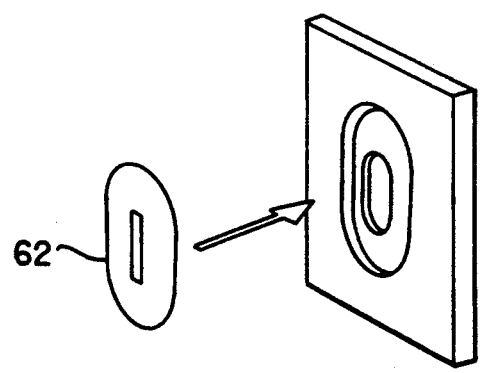
FIG. 5 is a perspective view of a slit for the entrance light.
Figure 8:
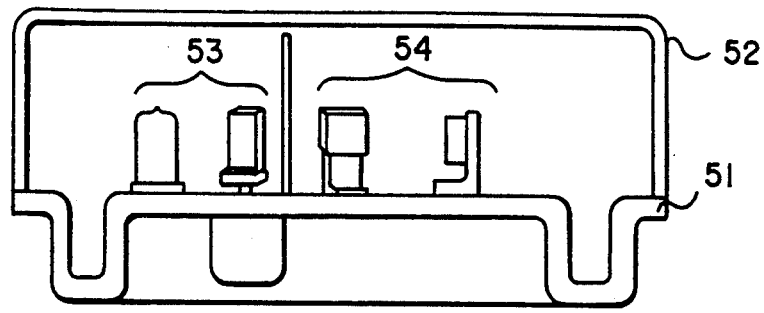
FIG. 8 is a cross-sectional view of a conventional spectrophotometer.
Figure 9:
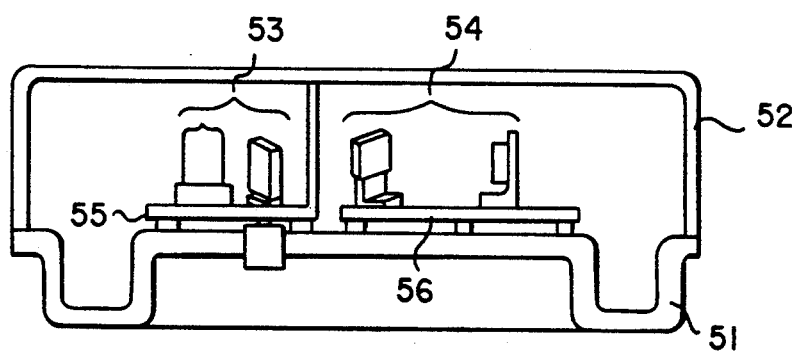
FIG. 9 is a cross-sectional view of a conventional spectrophotometer.

FIG. 5 shows the slit for the entrance light 5. A thin metal plate 62 has a slit, which is fabricated by an etching process. For the slit for entrance light, the thin metal plate 62 is positioned in a recess on the partition plate 10, and is secured with an adhesive agent, which is the ethoxyline resin known as "Araldite".

The slit for the exit light has the similar structure. For the slit for exit light 9, the thin metal plate is positioned in a recess which is fabricated on the wall of the frame 1, and is secured with an adhesive agent which is same as mentioned above.

A printed circuit board containing detector 22, in FIG. 2, is provided in order to provide electrical connections in the spectroscope portion 71, such as for a motor for the monochromator and the detector 22. The printed circuit board containing detector 22 is secured in its position by means of a boss 23, which is fabricated on the frame 1, and installed by screws.

A printed circuit board 24, in FIG. 1, is provided in order to provide electrical connections in the light source portion 70, such as for a motor for the lamp changing mechanism. The printed circuit board 24 is secured in its position by means of a boss 25, which is fabricated on the wall of the frame 1, and installed by screws.

Bosses 21, which are fabricated on the frame 1, are provided in order to install the spectrophotometer onto whole by base of the final product at the right position.

A liquid cell, which is provided for specimen liquid and a light intensity detector are positioned next to the light exit slit 9, which are not shown on figures.

Figure 12:
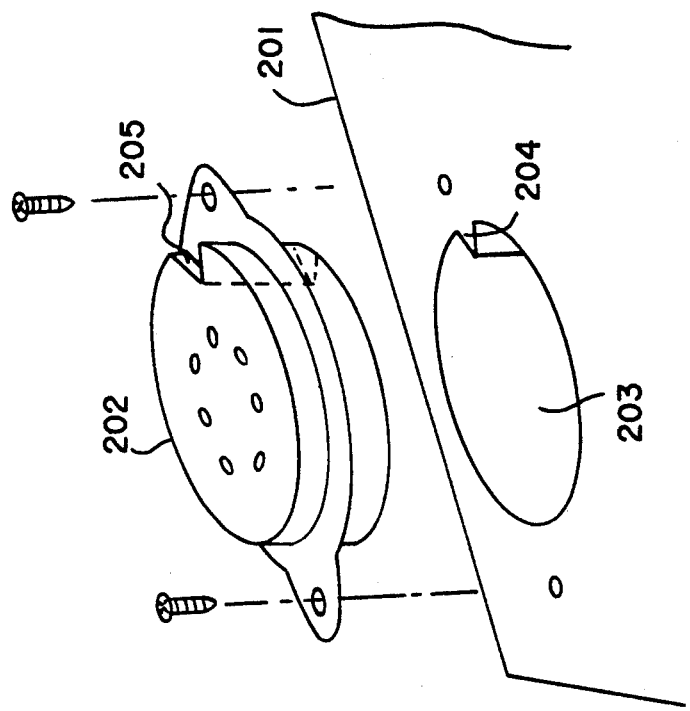
FIG. 12 is a perspective view of a socket portion of the second preferred embodiment.
Figure 11:
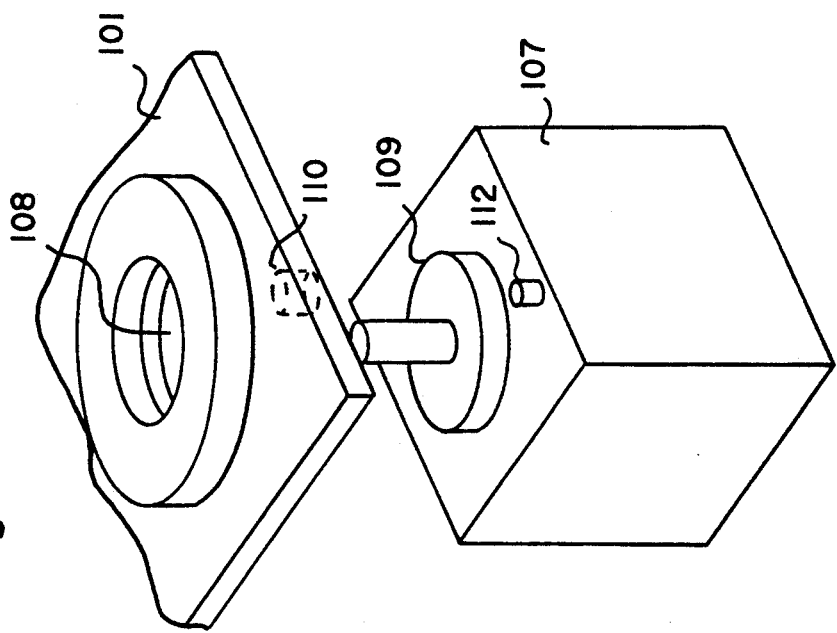
FIG. 11 is a perspective view of a motor portion of a second preferred embodiment.

FIG. 11 and FIG. 12 show some different aspects of this invention. Referring to FIG. 11, a frame 101, which is a part of the frame 1, has a hole 108 and a detent 110. A motor for a grating 107 has an annular step 109 and a boss 112. When the motor for grating 107 is installed, the boss 112 fits into the detent 110, and the annular step 109 fits into the hole 108, so that the motor for grating 107 is aligned in a desired orientation.

Referring to FIG. 12, a frame 201, which is a part of the frame 1, has a hole 203 and a boss 204 which projects inwardly from the periphery of the hole 203. A socket for deuterium lamp 202 has a detent or notch 205 forward therein. When the socket for the deuterium lamp is installed on the frame 201, the detent 205 fits into the boss 204, so that the socket for deuterium lamp is aligned in a desired orientation, before the socket is actually installed on the frame by screws.

The above described spectrophotometer includes all the necessary parts on the one frame. However, two or more separated frames made of GFRP can be used for a spectrophotometer.

Changes and modification in the specifically described embodiments can be carried out without departing form the scope of the invention which is intended to be limited only by the scope of the appended claims.

I claim:

1. A spectrometer, comprising;
    a frame which is made of glass fiber reinforced unsaturated polyester;
    an energy source which is installed on the frame, which generates electromagnetic waves;
    a separating means for separating the electromagnetic waves into spectral components, the separating means being installed on the frame;
    a detecting means for detecting intensity of the spectral components;
    a positioning means for positioning the energy source and the separating means on the frame, wherein the positioning means is fabricated on the frame; and
    an aligning means for aligning each of the energy source and the separating means in a specific orientation in their respective positions; wherein the frame, the positioning means, and the aligning means are integrally fabricated as a single body.

2. A spectrometer of claim 1, wherein the frame further comprises:
a base and,
walls which are formed around periphery of the base.

3. A spectrometer of claim 2, wherein the energy source is an element selected from the group consisting of a halogen lamp, a deuterium lamp and a tungsten lamp.

4. A spectroscope, comprising:
a frame which is made of glass fiber reinforced unsaturated polyester;
a monochromator, which is installed on the frame;
a positioning means for positioning an energy source on the frame, wherein the positioning means is fabricated on the frame; and
an aligning means for aligining the energy source in a specific orientation relative to the frame; wherein the frame, the positioning means, and the aligning means are integrally fabricated as a single body.

5. A method of making a spectrometer, which comprises the steps of:
heating glass fiber reinforced unsaturated polyester to a melting point;
inserting the melted glass fiber reinforced unsaturated polyester into molding pieces having a cavity for forming a body which includes a frame, positioning means, and aligning means for a spectrometer;
setting the melted glass fiber reinforced unsaturated polyester for a period of time until it solidifies;
removing the solidified glass fiber reinforced unsaturated polyester formed as a body from the molding pieces, the body having a frame, positioning means, and aligning means; and
installing an energy source and a separating means on the frame.

* * * * *